(12) United States Patent
Leseman (10) Patent No.: US 7,329,113 B2
(45) Date of Patent: Feb. 12, 2008

(54) ADJUSTABLE EXTRUSION DIE

(76) Inventor: Steven R. Leseman, 20435 Territorial Rd., Maple Grove, MN (US) 55311

( * ) Notice: Subject to any disclaimer, the term of this patent is extended or adjusted under 35 U.S.C. 154(b) by 270 days.

(21) Appl. No.: 11/085,634

(22) Filed: Mar. 21, 2005

(65) Prior Publication Data

US 2005/0208166 A1    Sep. 22, 2005

Related U.S. Application Data (60) Provisional application No. 60/554,599, filed on Mar. 19, 2004.

(51) Int. Cl.
*B29C 47/06* (2006.01)
(52) U.S. Cl. ...................... 425/381; 425/191
(58) Field of Classification Search ................ 425/113, 425/191, 381
See application file for complete search history.

(56) References Cited

U.S. PATENT DOCUMENTS

| | | | | |
|---|---|---|---|---|
| 3,856,446 A | * | 12/1974 | Schultz | 425/113 |
| 4,029,458 A | * | 6/1977 | Kim et al. | 425/135 |
| 4,068,615 A | | 1/1978 | LeNir | 118/6 |
| 4,076,570 A | | 2/1978 | Medley et al. | 156/244 |
| 4,472,129 A | * | 9/1984 | Siard | 425/381 |
| 4,568,507 A | * | 2/1986 | Baxter | 264/171.11 |
| 4,789,327 A | | 12/1988 | Chan et al. | 425/133.1 |
| 5,215,698 A | * | 6/1993 | Altimus | 264/167 |
| 5,542,937 A | | 8/1996 | Chee et al. | 604/280 |
| 5,853,770 A | * | 12/1998 | Guillemette | 425/113 |
| 5,980,226 A | * | 11/1999 | Guillemette | 425/113 |
| 6,050,801 A | * | 4/2000 | Eckenberg | 425/113 |
| 6,382,944 B1 | * | 5/2002 | Guillemette | 425/113 |
| 6,458,076 B1 | | 10/2002 | Pruitt | 600/146 |

* cited by examiner

*Primary Examiner*—Yogendra N. Gupta
*Assistant Examiner*—Dimple N. Bodawala
(74) *Attorney, Agent, or Firm*—Westman, Champlin & Kelly, P.A.

(57) ABSTRACT

An extrusion die assembly configured to process a flow of extrusion material traveling in a downstream direction includes a first die component, a second die component and a third die component. The first die component includes a first channel that is substantially coaxial to a longitudinal axis. The second die component is received within a downstream side of the first die component and has a position that is adjustable along the longitudinal axis relative to the first die component. The second die component includes a second channel that is substantially coaxial to the longitudinal axis. The third die component is received within a downstream side of the second die component and has a position that is adjustable along the longitudinal axis relative to the second die component. The third die component includes a third channel that is substantially coaxial to the longitudinal axis.

20 Claims, 7 Drawing Sheets

ADJUSTABLE EXTRUSION DIE

The present application claims the benefit of U.S. provisional patent application Ser. No. 60/554,599, filed Mar. 19, 2004, the content of which is hereby incorporated by reference in its entirety.

FIELD OF THE INVENTION

The present invention is generally directed to an extrusion die and, more particularly, to an extrusion die that includes die components that are adjustable along a longitudinal axis in which the material being extruded travels.

BACKGROUND OF THE INVENTION

Extrusion dies are used to apply coatings to substrates to form various products. Tubular products are generally formed by coating extrusion material on wire-like substrates, and film products are formed by coating extrusion material on sheet-like substrates.

Figure 1:
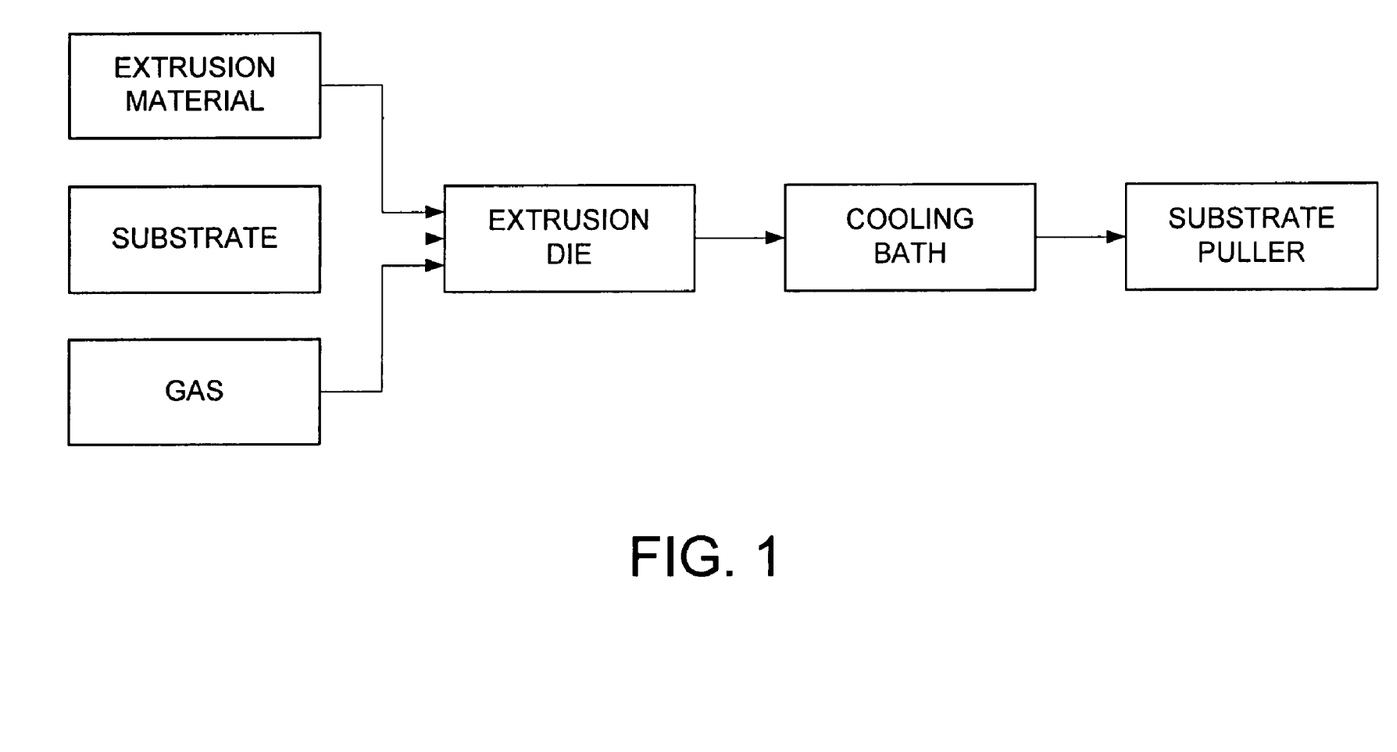
FIG. 1 is a schematic diagram of an extrusion system, in which the extrusion die of the present invention can be used.

FIG. 1 is schematic diagram of an extrusion system 100. The system 100 generally includes an extrusion material 102, a substrate 104 that is to be coated with the extrusion material 102, an extrusion die 106, a cooling bath 108, and a substrate puller 110. The extrusion material 102 is typically a polymer (i.e., plastic) that is heated to a molten form. The extrusion material 102 is typically driven by a screw device that provides a near continuous volumetric flow rate of the extrusion material 102 to the extrusion die 106.

The substrate 104 (e.g., wire-like or sheet-like) is pulled through the extrusion die 106 by the substrate puller 110 at a desired rate while the extrusion material 102 is simultaneously fed into the extrusion die 106. Both the substrate 104 and the extrusion material 102 travel in a longitudinal direction (indicated by arrow 112) through the extrusion die 106.

The extrusion die 106 typically includes a die component having a fixed channel through which the substrate 104 and the extrusion material travel. The channel causes the extrusion material 102 and the substrate 104 to converge such that the extrusion material 102 coats a surface of the substrate 104. An output portion of the channel generally defines a land length that operates to set the final shape of the extrusion material coating on the substrate 104 and complete the coating process.

For some applications, such as forming lumens in tubing, the system 100 includes a supply of pressurized gas 114 such as air, nitrogen, or other suitable gas. The pressurized gas 114 is fed through lumen channels in the extrusion die at a desired volumetric flow rate along with the substrate 104 and the extrusion material 102. The flow of gas is injected into the flow of extrusion material and creates a hollow tube within the coating on the substrate.

After the substrate 104 has been coated with the extrusion material, the coated product is fed through the cooling bath 108, which cools the molten extrusion material. For hollow tube products, the substrate 104 is separated from the coating.

When developing an extrusion die to form a new product, the die is generally tooled to certain specifications. With the configuration of the extrusion die channel generally fixed along the longitudinal axis in which the substrate and the extrusion material flow, the quality of the resultant product is highly dependent on the properties of the extrusion material. This is primarily due to the fact that the fixed channels of extrusion dies are generally configured to handle extrusion material having a particular rheology or flow characteristics. The flow characteristics of the extrusion material are dependent on its temperature, the pressure (generally fixed), and the material properties of the extrusion material (e.g., molecular weight). Accordingly, errors that are encountered during the development of an extrusion die must be corrected by either re-tooling the extrusion die, or by adjusting the settings of the flow of the extrusion material, such that the desired product can be produced.

Additionally, the tighter the tolerances of the product to be formed by the extrusion die and the more complex the product's structure is (e.g., one with lumens), the more difficult it is to develop the extrusion die due to the sensitivity of the resultant product on the rheology of the material flow. Unfortunately, different batches of the same type of extrusion material may have different molecular weights that can produce enough of a change in the rheology of the material to force an adjustment to either the extrusion die, or the temperature or pressure of the material flow, all of which can be very time-consuming.

There is a continuing need for improvements to extrusion dies including improvements that allow for more efficient development of extrusion dies for forming a new product. Embodiments of the present invention provide solutions to these and other problems, and offer other advantages over the prior art.

SUMMARY OF THE INVENTION

The present invention is generally direct to an extrusion die assembly configured to process a flow of extrusion material traveling in a downstream direction. In accordance with one embodiment of the invention, the extrusion die assembly includes a first die component, a second die component and a third die component. The first die component includes a first channel that is substantially coaxial to a longitudinal axis. The second die component is received within a downstream side of the first die component and has a position that is adjustable along the longitudinal axis relative to the first die component. The second die component includes a second channel that is substantially coaxial to the longitudinal axis. The third die component is received within a downstream side of the second die component and has a position that is adjustable along the longitudinal axis relative to the second die component. The third die component includes a third channel that is substantially coaxial to the longitudinal axis.

In accordance with another embodiment of the invention, the die assembly includes a first die component and a mandrel. The first die component includes a first channel that is substantially coaxial to a longitudinal axis. The mandrel is positioned adjacent the first die component and includes a mandrel channel that is substantially coaxial to the longitudinal axis, a mandrel tip at a downstream end through which the mandrel channel extends, and a mandrel projection extending from the mandrel in the downstream direction beyond the mandrel tip.

Other features and benefits that characterize embodiments of the present invention will be apparent upon reading the following detailed description and review of the associated drawings.

DETAILED DESCRIPTION OF THE PREFERRED EMBODIMENTS

Figure 2:
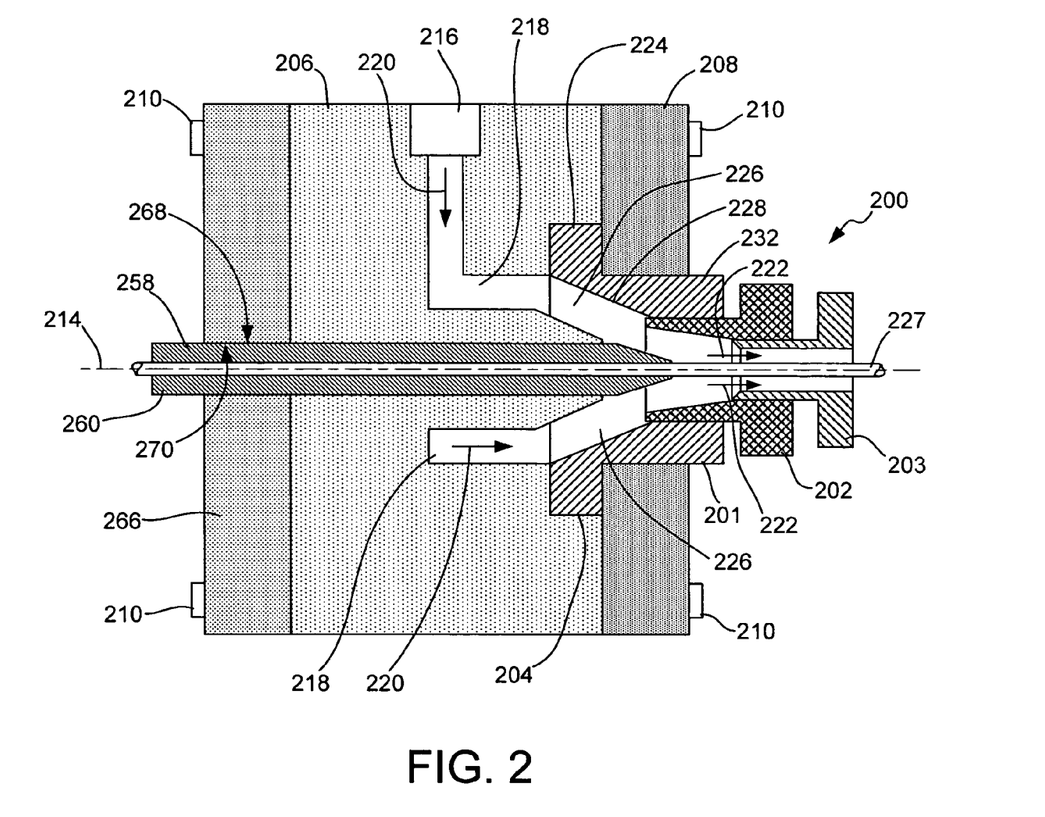
FIG. 2 is a cross-sectional view of an extrusion die in accordance with embodiments of the invention.
Figure 3:
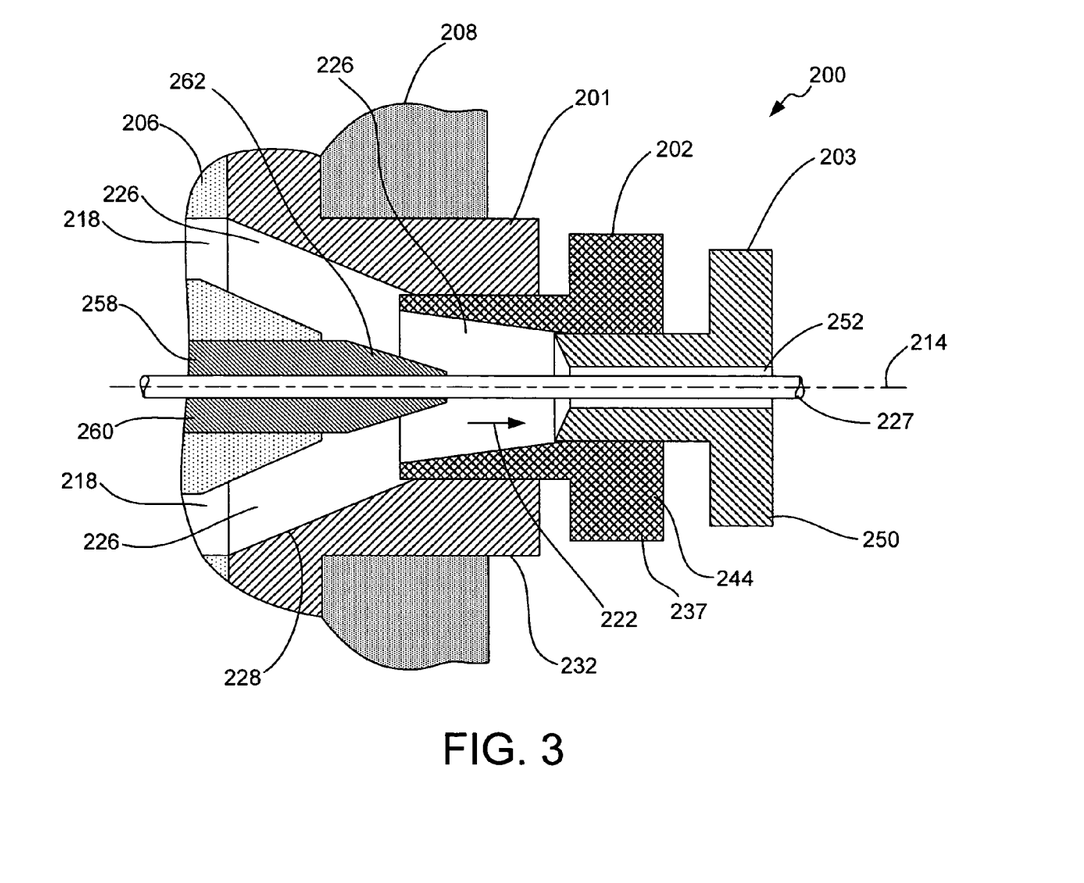
FIGS. 3 and 4 are magnified views of assembled and exploded adjustable die components of the extrusion die of FIG. 2 with a set plate removed.
Figure 4:
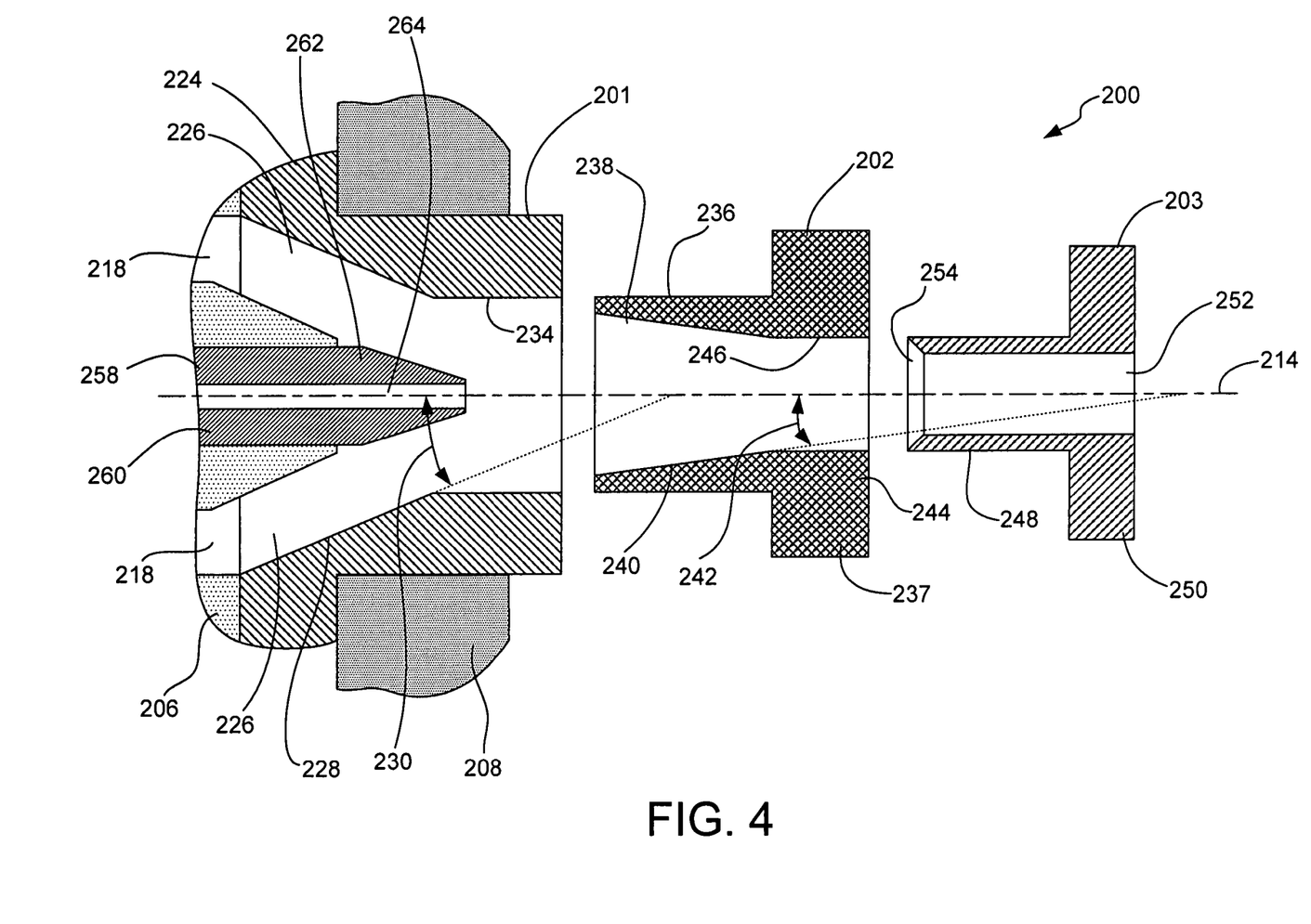

The present invention is generally directed to an extrusion die assembly 200, cross-sectional views of which are provided in FIGS. 2-4. One embodiment of the extrusion die 200 includes a first die component 201, a second die component 202, and a third die component 203.

The first die component 201 is supported within a recess 204 of a die holder 206 and secured in place by a set plate 208 using bolts 210 or other suitable fastener. A flow of molten extrusion material, such as a polymer or a low-melt metal, is received at an inlet port 216 and delivered through an annular inlet channel 218 of the die holder 206 to the extrusion die 200, as indicated by arrows 220. The flow of molten extrusion material then travels through the extrusion die 200 in a downstream direction along the longitudinal axis 214, as indicated by arrows 222. The molten extrusion material is driven at a desired volumetric flow rate from a screw drive or other device in accordance with conventional methods.

The first die component 201 includes a flange 224 that is received within the recess 204 of the die holder 206 and is secured by the set plate 208. The first die component also includes a through channel 226 having a cross-sectional shape in the plane that is perpendicular to the longitudinal axis 214 that is configured for the production of the desired product. For example, the through channel 226 is preferably an annular channel that is coaxial or substantially coaxial to the longitudinal axis 214, which is useful for coating wire-like substrates, such as substrate 227, shown in FIG. 2. However, the channel 226 can have other non-circular cross-sectional shapes, particularly when the application is for coating a film or non-circular substrate.

It should be understood that components of the present invention, although described as being "coaxial" to the longitudinal axis, can be offset slightly therefrom if necessary. Accordingly, the phrase "substantially coaxial" as used herein is intended to cover such situations.

One embodiment of the channel 226 of the first die component 201 includes a tapered section 228, the interior walls of which are at an impingement angle 230 to the longitudinal axis 214, as shown in FIG. 4. Embodiments of the tapered section 228 include tapering the walls of the channel 226 toward the longitudinal axis 214 along the downstream direction 222 (acute impingement angle), as shown in FIG. 4, or tapering the walls of the channel 226 away from the longitudinal axis 214 (obtuse impingement angle).

The second die component 202 is received within a downstream side 232 of the first die component 201. The position of the second die component 202 is adjustable along the longitudinal axis 214 relative to the first die component 201. In accordance with one embodiment of the invention, the wall of the channel 226 of the first die component 201 includes a threaded section 234 (FIG. 4) that is downstream of the tapered section 228 and is configured to receive a threaded exterior surface 236 of the second die component 202. The threaded engagement between the surfaces 234 and 236 allow for precise adjustment to the position of the second die component 202 relative to the first die component 201 along the longitudinal axis 214. A head 237 is preferably shaped to received a wrench or other tool that is used to adjust the position of the second die component 202 relative to the first die component 201.

The second die component 202 includes a through channel 238 that receives the flow of extrusion material from the channel 226 of the first die component 201. As with the through channel 226 of the first die component 201, the channel 238 has a cross-sectional shape in the plane that is perpendicular to the longitudinal axis 214 that is configured for the production of the desired product. One embodiment of the channel 238 is an annular channel that is coaxial or substantially coaxial to the longitudinal axis 214. Another embodiment of the through channel 238 includes a tapered section 240, the interior walls of which are at an impingement angle 242 to the longitudinal axis 214, as shown in FIG. 4. Embodiments of the tapered section 240 include tapering the walls of the channel 238 toward the longitudinal axis 214 along the downstream direction 222 (acute impingement angle), as shown in FIG. 4, or tapering the walls of the channel 238 away from the longitudinal axis 214 (obtuse impingement angle).

The impingement angles of the first and second die components 201 and 201 can be equal or different from each other. In accordance with one embodiment of the invention, the impingement angle 230 of the first die component 201 is larger than the impingement angle 242 of the second die component. In accordance with another embodiment of the invention, the impingement angle 230 of the first die component 201 is smaller than the impingement angle 242 of the second die component.

The third die component 203 is received within a downstream side 244 of the second die component 202. The position of the third die component 203 is adjustable along the longitudinal axis 214 relative to the first and second die components 201 and 202. In accordance with one embodiment of the invention, the wall of the channel 238 of the second die component 202 includes a threaded section 246 (FIG. 4) that is downstream of the tapered section 240 and is configured to receive a threaded exterior surface 248 of the third die component 203. The threaded engagement between the threaded surfaces 246 and 248 allow for precise adjustment to the position of the third die component 203 relative to the second die component 202 along the longitudinal axis 214. A head 250 is preferably shaped to received a wrench or other tool that is used to adjust the position of the third die component 203 relative to the second die component 202.

The third die component 203 includes a through channel 252 that receives the flow of extrusion material from the channel 238 of the second die component 202. As with the through channels 226 and 238, the channel 252 has a cross-sectional shape in the plane that is perpendicular to the longitudinal axis 214 that is configured for the production of the desired product. One embodiment of the channel 252 is an annular channel that is coaxial or substantially coaxial to the longitudinal axis 214. In accordance with one embodiment of the invention, the through channel 252 is cylindrical and defines a land length for the die, and sets the final exterior shape of the coating on the substrate 227. Another embodiment of the through channel 252 includes a tapered input section 254.

One embodiment of the extrusion die includes a mandrel 258 that includes a mandrel body 260 that extends through the die holder 206. A mandrel tip 262 of the mandrel body 260 extends into the channel 226 of the first die component 201. The mandrel body 260 includes a through channel 264 that is substantially coaxial to the longitudinal axis 214. The substrate 227 can be pulled through the channel 264 by the substrate puller 110, as shown in FIG. 3. Alternatively, gas can be injected through the channel 264 and into the flow of extrusion material.

In accordance with one embodiment of the invention, the mandrel body 260 has a position that is adjustable along the longitudinal axis 214 relative to the first die component 201. Preferably, the mandrel body 260 is secured in the desired position by a back plate 266, which in turn is secured to the die holder 206 with bolts 210 or other fasteners. In accordance with one embodiment of the invention, the mandrel body 260 includes a threaded exterior surface 268 that engages a threaded interior surface 270 of the back plate 266. The position of the mandrel body 260 can then be adjusted by rotating the mandrel body 260 relative to the back plate 266. A nut (not shown) can be threaded over the surface 268 and against the back plate 266 to secure the position of the mandrel body 260 in place.

Figure 5:
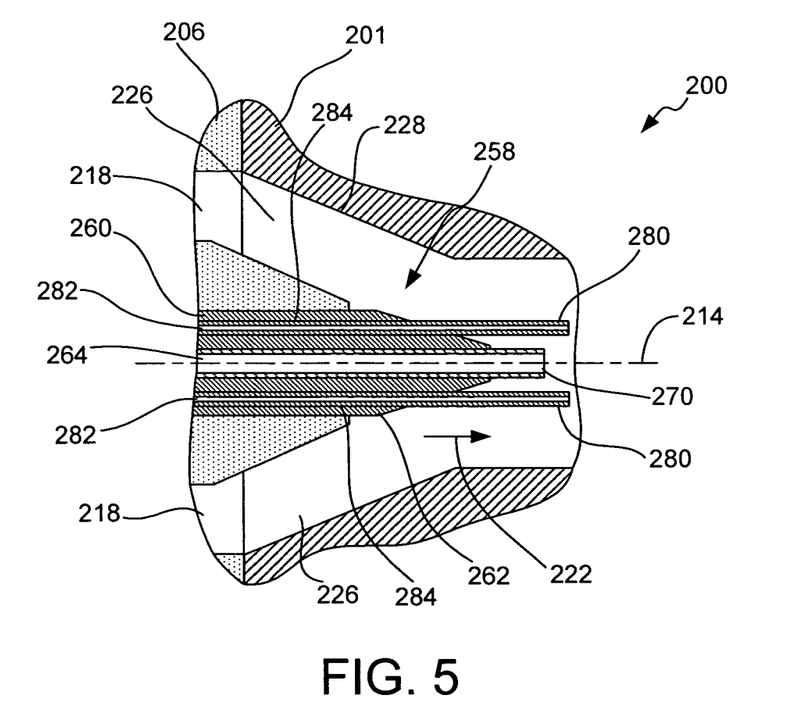
FIG. 5 is a side cross-sectional view of a portion of an extrusion die including a tip portion of a mandrel in accordance with embodiments of the invention.
Figure 6:
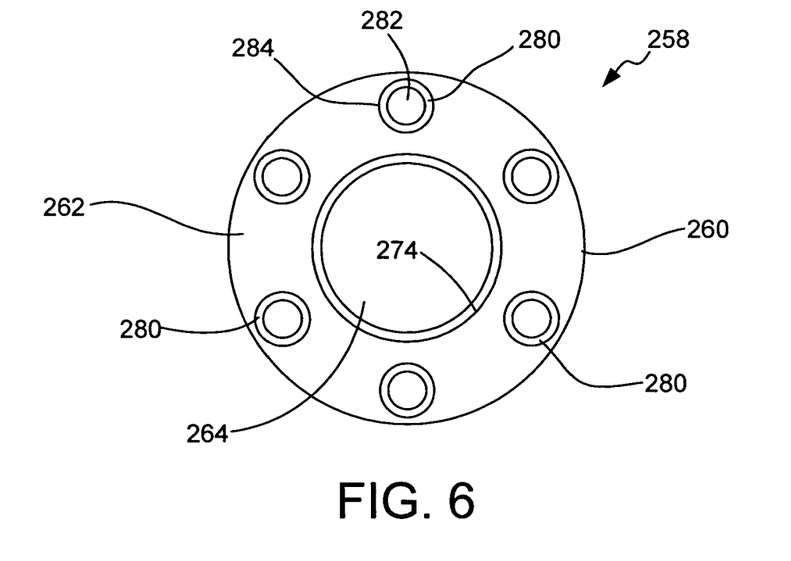
FIG. 6 is a front plan view of a mandrel tip portion of a mandrel in accordance with embodiments of the invention.
Figure 7:
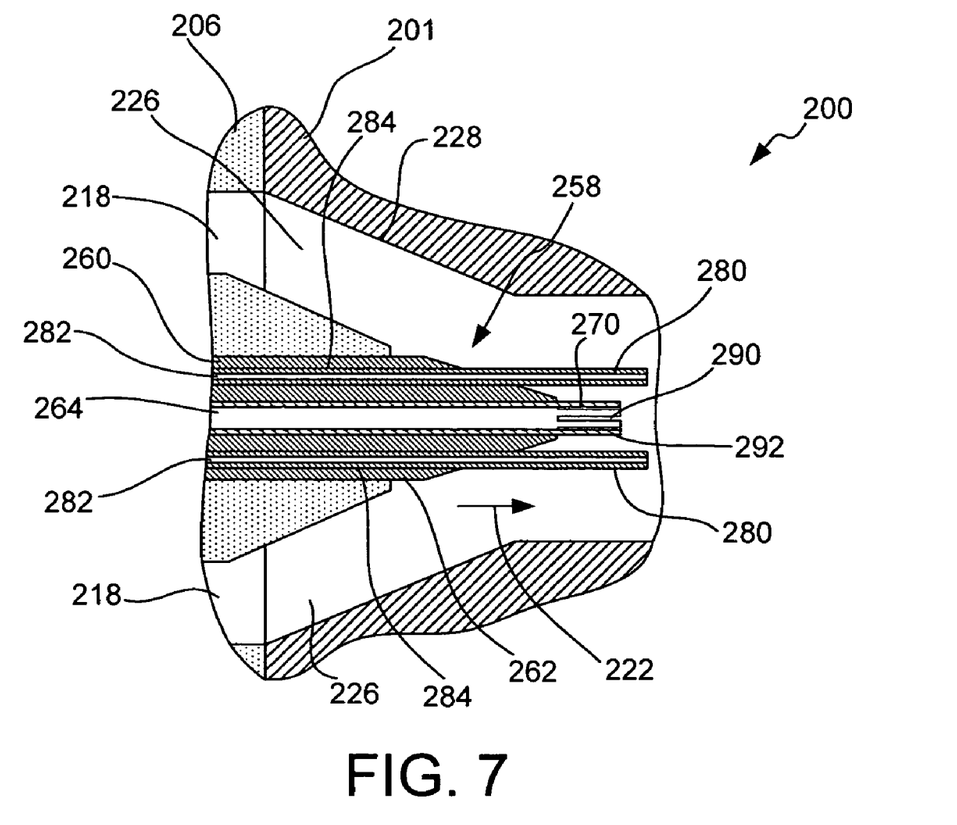
FIG. 7 is a side cross-sectional view of a portion of an extrusion die including a mandrel tip portion of a mandrel in accordance with embodiments of the invention.
Figure 8:
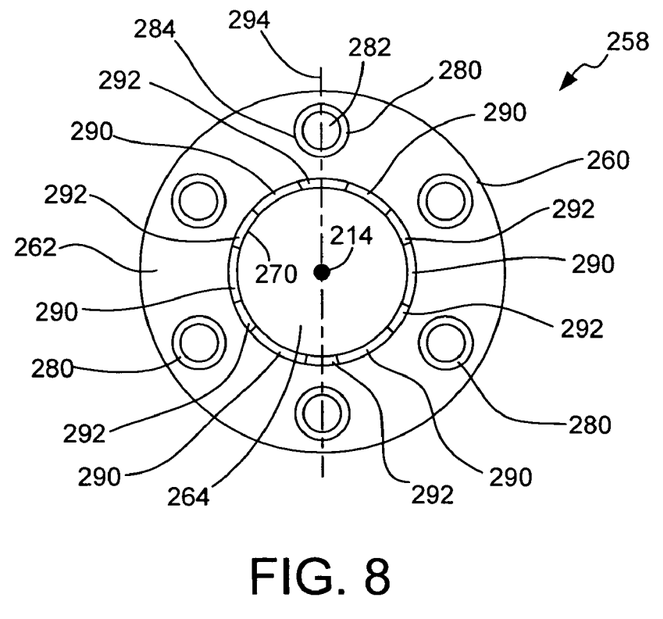
FIGS. 8 and 9 are front plan views of a mandrel tip portion of a mandrel in accordance with embodiments of the invention.
Figure 9:
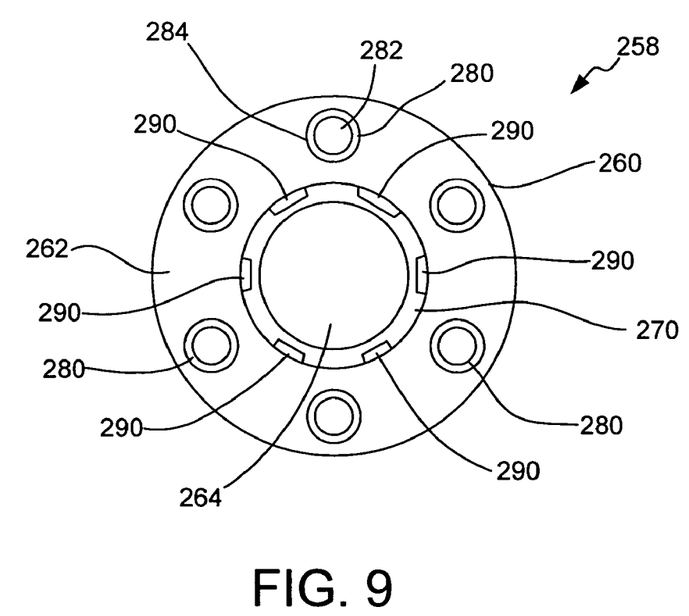

Additional embodiments of the mandrel 258 will be discussed with reference to FIGS. 5-9. FIGS. 5 and 7 are side cross-sectional views of a portion of an extrusion die 200 including a mandrel tip portion 262 of a mandrel 258 in accordance with embodiments of the invention. FIGS. 6, 8 and 9 are front plan views of the mandrel tip portion 262 of a mandrel 258 in accordance with embodiments of the invention.

One embodiment of the mandrel 258 includes a mandrel projection 270 that extends from the mandrel tip 262 in the downstream direction (indicated by arrow 222), as shown in FIGS. 5 and 7. One embodiment of the mandrel projection 270 can be formed integral to the mandrel body 260 or formed by a tube 272 that extends through a bore 274 in the mandrel body 260. The tube 272 defines the channel 264, through which air or the substrate are fed.

In accordance with one embodiment of the invention, the position of the tube 272 is adjustable along the longitudinal axis 214 relative to the mandrel tip 262. Thus, the distance the mandrel projections 270 extends beyond the mandrel tip 262 can be adjusted. The mandrel projection tube 272 can be secured in place relative to the mandrel tip 262 using any suitable means.

The cross-sectional shape of the mandrel projection 270 can be in accordance with the desired extrusion operation to be performed. In accordance with one embodiment of the invention, the mandrel projection has a circular cross-sectional shape, as shown in FIG. 6. Additional shapes of the mandrel projection 270 will be discussed below.

Another embodiment of the mandrel 258 includes at least one lumen tube 280. Each lumen tube 280 extends in the downstream direction 222 beyond the mandrel tip 260. Each lumen tube 280 includes a through channel 282 through which a gas, such as from gas supply 114 (FIG. 1), is injected in a controlled manner into the flow of molten extrusion material at the downstream end of the lumen tube 280. Alternatively, a substrate could also be fed through the channel 282 to form other types of products.

In accordance with one embodiment of the invention, the mandrel tubes 280 extend from the mandrel body 260, as shown in FIGS. 5 and 7. The mandrel tubes 280 can be formed integral to the mandrel body 260 or inserted through a bore 284 in the mandrel body 260. In accordance with one embodiment of the invention, the position of the lumen tubes 280 is adjustable along the longitudinal axis 214 relative lumen tubes 280 extend beyond the mandrel tip 262 can be adjusted. The lumen tubes 280 can be secured in place relative to the mandrel tip 262 using any suitable means.

In accordance with one embodiment of the invention, the mandrel projection 270 includes at least one slot 290 that extends either completely through the mandrel projection 270, as shown in FIGS. 7 and 8, or partially through the mandrel projection 270, as shown in FIG. 9. The slots 290 in the mandrel projection 270 of FIG. 8 result in one or more stems 292 extending from the mandrel tip 262 in the downstream direction. In accordance with one embodiment of the invention, at least one of the stems 292 of the mandrel projection 270 and the lumen tubes 280 lie in a plane 294 extending radially from the longitudinal axis 214, as shown in FIG. 8.

Additional embodiments of the mandrel projection 270 include a plurality of apertures through the mandrel projection tube 272 that is beyond the mandrel tip 262 and other configurations.

In operation, the substrate 227 is pulled through the channel 264 of the mandrel body 260 at a desired rate that is set in accordance with the flow of extrusion material through the die 200. Gas can be injected through the channels 282 of one or more of the lumen tubes, which is then introduced into the flow of extrusion material. The mandrel projection 270 of FIGS. 5 and 6 allows the flow of extrusion material to become more laminar when it contacts the substrate 227 at the downstream opening and when the gas is injected into the flow through the lumen tubes 280, as compared to prior art methods that do not extend such locations from the mandrel tip. The more laminar the flow of the extrusion material is at the outlets of the lumen tubes 280, the lower the chance of generating imperfections in the lumens in the resultant product. The mandrel projection 270 of FIGS. 7-9 that includes the slots 290 provides further improvement to the coating of the substrate 227. The relative positions of the outlet of the mandrel projection 270 and the outlets of the lumen tubes can be adjusted as necessary to produce the desired product.

The ability to adjust the relative positions of the die components 201, 202 and 203 along the longitudinal axis 214 allows the extrusion die to make changes to the flow of the extrusion material without having to re-tool the die, replace the die, adjust the temperature of the extrusion material, or the volumetric flow (i.e., pressure) of the extrusion material. As a result, the extrusion die 200 of the present invention is capable of reducing the time required to develop a suitable extrusion die to form a new product and to adapt to changing extrusion materials.

The velocity at which the extrusion material travels through different sections of the die 200 can be adjusted by adjusting the pressure drops within the extrusion die by changing the relative positions of the second and third die components 202 and 203 relative to each other and the first die component 201. For instance, a pressure drop in the flow of the extrusion material at the junction of the first and second die components 201 and 202 can be increased due to an increase in flow restriction by moving the position of the second die component 202 in the upstream direction (opposite the direction indicated by arrow 222) along the longitudinal axis relative to the first die component 201, which further restricts the flow of extrusion material. For a given volumetric flow rate of the extrusion material through the extrusion die 200, such an increase in the pressure drop at the junction results in an increase in the velocity at which the extrusion material is traveling at the junction.

Likewise the pressure drop at the junction of the first and second die components 201 and 202 can be decreased due to a decrease in flow restriction by moving the position of the second die component 202 in the downstream direction 222 along the longitudinal axis relative to the first die component 201, which reduces the restriction on the flow of extrusion material. For a given volumetric flow rate of the extrusion material through the extrusion die 200, such a decrease in the pressure drop at the junction results in an decrease in the velocity at which the extrusion material is traveling at the junction.

The velocity of the flow of extrusion material can be similarly adjusted at the junction between the second and third die components 202 and 203.

The position of the second die component can dictate the location at which the flow of extrusion material impinges the substrate 227 to be coated. Additionally, the velocity and pressure of the flow of the extrusion material at the substrate can also be controlled as discussed above, each of which play a role in the manner in which the substrate is coated. For example, the velocity and pressure play a role in determining the amount of heat that is transferred from the flow of extrusion material to the substrate. This is particularly important when, for example, the substrate has a melting point that is below that of the temperature of the flowing extrusion material. For such an arrangement, it is essential that the pressure and velocity of the flow of extrusion material be controlled to prevent the flow from melting the substrate.

The position of the third die component can effect the pressure drop in the flow of extrusion material across its length. That pressure drop has an effect on the manner in which the coating and the substrate 227 exit the die and, thus, the final shape of the coating on the substrate 227. Thus, the ability to adjust the pressure drop across the third die component 203 can be very useful in tweaking the extrusion process for a given product.

Thus, the ability to adjust the relative positions of the die components of the extrusion die 200 of the present invention can be used to control properties of the flow of the extrusion material through the die 200. As a result, time-consuming adjustments to the temperature of the extrusion material, the volumetric flow rate of the extrusion material, or the retooling or replacement of the extrusion die itself, can be avoided.

Although the present invention has been described with reference to preferred embodiments, workers skilled in the art will recognize that changes may be made in form and detail without departing from the spirit and scope of the invention. For example, those skilled in the art understand that various cross-sectional shapes of the channels of the extrusion die through which the molten extrusion material travels can also be employed. Additionally, although exemplary embodiments of the extrusion die have been described with respect to the drawings that illustrate a tubular coating die, those skilled in the art understand that the principles of the present invention can be applied to extrusion dies that are configured for use in other extrusion processes such as, for example, film coating processes. Furthermore, it should be understood that the drawings are simplified drawings that are not necessarily drawn to scale.

What is claimed is:

1. An extrusion die assembly configured to process a flow of extrusion material traveling in a downstream direction, the assembly comprising:
   a first die component having a first channel substantially coaxial to a longitudinal axis;
   a second die component received within a downstream side of the first die component and having a position that is adjustable along the longitudinal axis relative to the first die component, the second die component having a second channel that is substantially coaxial to the longitudinal axis; and
   a third die component received within a downstream side of the second die component and having a position that is adjustable along the longitudinal axis relative to the second die component, the third die component having a third channel that is substantially coaxial to the longitudinal axis.

2. The assembly of claim 1, wherein the first channel, the second channel and the third channel each have an annular cross-section.

3. The assembly of claim 2, wherein the first and second channels each include tapered sections that taper toward the longitudinal axis along the downstream direction.

4. The assembly of claim 1, wherein:
   the first channel includes a threaded section;
   the second second die component includes a threaded exterior surface received within the threaded section of the first annular channel; and
   the third die component includes a threaded exterior surface received within a threaded section of the second annular channel.

5. The assembly of claim 1 including a mandrel adjacent the first die component including a mandrel body having mandrel channel substantially coaxial to the longitudinal axis and a mandrel tip at a downstream end through which the mandrel channel extends.

6. The assembly of claim 5 including a mandrel projection extending from the mandrel body in the downstream direction beyond the mandrel tip through which the mandrel channel extends.

7. The assembly of claim 6 including a lumen tube having a through channel that is non-coaxial to the longitudinal axis, the lumen tube extending from the mandrel in the downstream direction beyond the mandrel tip.

8. The assembly of claim 7, wherein a portion of the mandrel projection is positioned between the lumen tube and the longitudinal axis.

9. The assembly of claim 8, wherein the lumen tube and the mandrel projection lie in a plane extending radially from the longitudinal axis.

10. The assembly of claim 5, wherein the mandrel body has a position that is adjustable along the longitudinal axis relative to the first die component.

11. The assembly of claim 6, wherein the mandrel projection includes a plurality of stems extending in the downstream direction beyond the mandrel tip.

12. The assembly of claim 8, wherein the mandrel projection includes a tube extending from the mandrel body in the downstream direction beyond the mandrel tip and having an annular channel that is substantially coaxial to the longitudinal axis.

13. The assembly of claim 12, wherein a wall of the mandrel projection tube includes an exterior surface having a slot extending in the longitudinal direction.

14. An extrusion die assembly configured to process a flow of extrusion material traveling in a downstream direction, the die comprising:
- a first die component having a first channel substantially coaxial to a longitudinal axis; and
- a mandrel adjacent the first die component including a mandrel body and a mandrel projection, the mandrel body having mandrel channel substantially coaxial to the longitudinal axis and a mandrel tip at a downstream end through which the mandrel channel extends, the mandrel projection extending from the mandrel body in the downstream direction beyond the mandrel tip.

15. The assembly of claim 14, wherein the mandrel body has a position that is adjustable along the longitudinal axis relative to the first die component.

16. The assembly of claim 14 including a lumen tube having a through channel that is non-coaxial to the longitudinal axis, the lumen tube extending from the mandrel body in the downstream direction beyond the mandrel tip.

17. The assembly of claim 14, wherein the mandrel projection includes a plurality of stems extending in the downstream direction beyond the mandrel tip.

18. The assembly of claim 14 including a mandrel projection tube extending from the mandrel body in the downstream direction beyond the mandrel tip and including a channel that is coaxial to the mandrel channel.

19. The assembly of claim 18, wherein the wall of the mandrel projection tube includes an exterior surface having a slot extending in the longitudinal direction.

20. The assembly of claim 14 including:
- a second die component received within a downstream side of the first die component and having a position that is adjustable along the longitudinal axis relative to the first die component, the second die component having a second channel substantially coaxial to the longitudinal axis; and
- a third die component received within a downstream side of the second die component and having a position that is adjustable along the longitudinal axis relative to the second die component, a third die component having a third channel substantially coaxial to the longitudinal axis.

* * * * *

UNITED STATES PATENT AND TRADEMARK OFFICE
CERTIFICATE OF CORRECTION

PATENT NO. : 7,329,113 B2  Page 1 of 1
APPLICATION NO. : 11/085634
DATED : February 12, 2008
INVENTOR(S) : Steven R. Leseman

It is certified that error appears in the above-identified patent and that said Letters Patent is hereby corrected as shown below:

Col. 8, line 29, remove "second" as shown below:

'the ~~second~~ second die component includes a threaded'

Signed and Sealed this

Third Day of June, 2008

JON W. DUDAS
*Director of the United States Patent and Trademark Office*